United States Patent
Takata

(10) Patent No.: US 6,817,015 B2
(45) Date of Patent: Nov. 9, 2004

(54) MICROCONTROLLER WITH MODIFIABLE PROGRAM

(75) Inventor: Toshio Takata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 536 days.

(21) Appl. No.: 09/987,039

(22) Filed: Nov. 13, 2001

(65) Prior Publication Data

US 2002/0062479 A1 May 23, 2002

(30) Foreign Application Priority Data

Nov. 21, 2000 (JP) ........................................ 2000-354112

(51) Int. Cl.[7] ................................................ G06F 9/44
(52) U.S. Cl. ........................ 717/168; 717/127; 717/129; 711/103; 711/133; 712/211
(58) Field of Search ................................. 717/168, 127, 717/129, 131; 711/103, 133, 144; 712/209–211

(56) References Cited

U.S. PATENT DOCUMENTS

| | | | | |
|---|---|---|---|---|
| 5,524,212 A | * | 6/1996 | Somani et al. | 711/121 |
| 5,854,913 A | * | 12/1998 | Goetz et al. | 712/210 |
| 5,875,464 A | * | 2/1999 | Kirk | 711/129 |
| 6,477,642 B1 | * | 11/2002 | Lupo | 713/2 |
| 6,658,651 B2 | * | 12/2003 | O'Brien et al. | 717/127 |
| 6,698,017 B1 | * | 2/2004 | Adamovits et al. | 717/168 |

FOREIGN PATENT DOCUMENTS

JP 11282665 10/1999

OTHER PUBLICATIONS

TITLE: The Reduction of Branch Instruction Execution Overhead Using Structured Control Flow, author: Wedig et al, IEEE, 1984.*
TITLE: Instruction Fetch Mechanisms for Multipath Execution Processors, author: Klauser et al, IEEE, 1999.*

* cited by examiner

Primary Examiner—Chameli C. Das
(74) Attorney, Agent, or Firm—Rabin & Berdo, P.C.

(57) ABSTRACT

A microcontroller has a nonvolatile memory that originally stores program code and has free space. When part of the program code needs to be modified, that part is disabled, and modified program code is stored in the free space. The modified program code is executed in place of the disabled program code. Program code can be disabled by changing instructions to a designated instruction, by storing the address of the disabled program code in the nonvolatile memory and loading this address into a disabled code detector, or by deleting the address of the disabled program code from an address list in the nonvolatile memory and adding the address of the modified program code to the list. In this way, the program stored in even a one-time-programmable microcontroller can be changed to meet altered specifications or correct program bugs.

14 Claims, 8 Drawing Sheets

MICROCONTROLLER WITH MODIFIABLE PROGRAM

BACKGROUND OF THE INVENTION

The present invention relates to a microcontroller with a nonvolatile program memory, more particularly to a one-time-programmable microcontroller having features enabling program modifications to be made.

Microcontrollers, sometimes referred to as one-chip microcomputers, are used to control a wide range of electrical and mechanical appliances. Early microcontrollers included a central processing unit (CPU) and a mask-programmable read-only memory (ROM) storing the program executed by the CPU. The program contents were determined by the patterns on glass masks used in the fabrication process. Such microcontrollers could be produced inexpensively in large quantities, but their programs could not be modified after fabrication. If, as not infrequently happened, an application programmer found a bug in an application program after production had begun, the only way to fix the bug was to make a new set of glass masks and begin production again. This was a time-consuming process that was economically impractical for low-volume, high-diversity production.

To meet the need for easier program modification, microcontrollers with erasable programmable read-only memory (EPROM) were developed in the 1970s. EPROM is a type of nonvolatile memory in which the memory cells are transistors with floating gates. The individual transistors can be programmed by applying a high source-drain voltage, thereby injecting electrons into the floating gates. The entire memory can be erased by exposure to ultraviolet light, producing a photoelectric effect that enables electrons to escape from the floating gates. Enclosed in ceramic packages with quartz windows transparent to ultraviolet wavelengths, microcontrollers equipped with EPROM could be programmed, erased, and programmed again any number of times after fabrication, but the windowed ceramic packaging made these microcontrollers expensive.

A one-time-programmable (OTP) microcontroller includes EPROM but is enclosed in an inexpensive plastic package without a window. During the wafer fabrication and testing process, prior to dicing and packaging, the EPROM in an OTP microcontroller can be programmed and erased repeatedly. After packaging, since its EPROM cannot be erased, an OTP microcontroller can be programmed only once. OTP microcontrollers combine comparatively low cost with the ability to implement program changes promptly and easily, without changing the fabrication masks, so they have been used in a wide range of applications, including automobile cabin temperature control, computer keyboard control, motor control, and modem control, to name just a few.

Referring to FIG. 1, a conventional OTP microcontroller comprises a semiconductor chip 1 with an EPROM 2 for program storage and an EPROM programming circuit 3, which is coupled to a high-voltage terminal 4. The semiconductor chip 1 also includes a readable and writable random-access memory (RAM) 5 for storing data being processed, an internal bus 6, a CPU 7, and various other specialized modules (not visible). The high-voltage terminal 4 is normally held at the power-supply voltage VDD (e.g., five volts), but during programming of the EPROM 2, a higher programming voltage VPP (e.g., twelve volts) is applied, to create an electric field sufficient to inject electrons into floating gates by the tunnel effect. Incidentally, some conventional OTP microcontrollers can be brought into a test mode, for testing of the EPROM 2, by placing the high-voltage terminal 4 at the ground potential VSS (zero volts) during a reset.

One-time programmability means that once an OTP microcontroller has been packaged and programmed, new program code cannot be overwritten on existing program code. That is, the electrons injected into a floating gate by application of VPP during a programming operation are held in the floating gate essentially permanently, and cannot be removed by another programming operation. They can only be removed by exposure to ultraviolet light, which is not possible in a packaged device. This does not prevent new program code from being written later into non-programmed memory areas, but with conventional microcontrollers there would be no point in doing this, because the microcontroller would simply continue to execute its original program, and would ignore the new program code. The original program is normally stored in a continuous address area, and is self-contained, with no means for diverting execution into a new program area.

During application program development, there is no need to modify a program that has already been stored in the EPROM of an OTP microcontroller. The modified program can simply be written in its entirety into a new OTP microcontroller that has not yet been programmed. After program development has been completed and microcontrollers have been programmed or shipped in quantity, however, there may be an urgent need to modify part of the existing program code, to implement a program change requested by a customer, for example, or to fix a bug discovered in further tests or in the field. Since the program code in microcontrollers that have already been programmed cannot be modified, these microcontrollers must be discarded or replaced. When minor program bugs have to be fixed frequently in this way, the resulting economic cost can become intolerable.

A known method of circumventing this problem provides a microcontroller with on-chip ROM for storing application program code, external EPROM for storing modified program code, and on-chip RAM into which the modified program code can be loaded and executed. Japanese Unexamined Patent Application No. 2995030, for example, discloses a scheme in which the CPU sets a particular address in an interrupt control circuit; when program execution reaches this address, a CPU interrupt occurs, and an interrupt-handling routine writes the modified program code into the RAM. Because it requires an external EPROM to store the modified program code, however, this scheme is expensive and inconvenient and loses many of the advantages of an OTP microcontroller.

SUMMARY OF THE INVENTION

An object of the present invention is to provide a microcontroller that, after being programmed once, can be further programmed with additional program code, and can execute the additional program code in place of part of its original program.

According to one aspect of the invention, a microcontroller includes a nonvolatile memory, a disabled code detector, and a processing unit. The nonvolatile memory originally stores a first program and an interrupt-handling routine, and includes some free space. When part of the first program needs to be modified, this part is disabled, and a second program is stored in the free space. During execution of the first program by the processing unit, the disabled code detector detects the disabled part of the first program and generates an interrupt signal. The interrupt-handling routine then redirects execution to the second program, which is executed in place of the disabled part of the first program. The second program ends by returning to the first program.

Part of the first program can be disabled by changing one or more instructions of that part to a designated instruction, in which case the disabled code detector detects the instruction code of the designated instruction. Alternatively, part of the first program can be disabled by having the disabled code detector detect the address of the disabled part, in which case the address of the disabled part is stored in the non-volatile memory and loaded into the disabled code detector during an initialization process.

According to a second aspect of the invention, a microcontroller has a nonvolatile memory and a processing unit. The nonvolatile memory stores a main program, a plurality of subprograms, and an address list giving the address of each subprogram. The address list also includes spare addresses. When a subprogram needs to be modified, a modified program is additionally stored in the nonvolatile memory as an entire replacement for the subprogram, the address of the subprogram is marked as deleted in the address list, and the address of the modified program is stored in a spare address in the address list.

When the processing unit executes the main program, the addresses in the address list are used to redirect execution to the subprograms. If the address of a subprogram has been marked as deleted in the address list, execution is redirected to the relevant modified program instead.

DETAILED DESCRIPTION OF THE INVENTION

Embodiments of the invention will be described with reference to the attached drawings. First a general description will be given, then four specific embodiments will be described.

Figure 1:
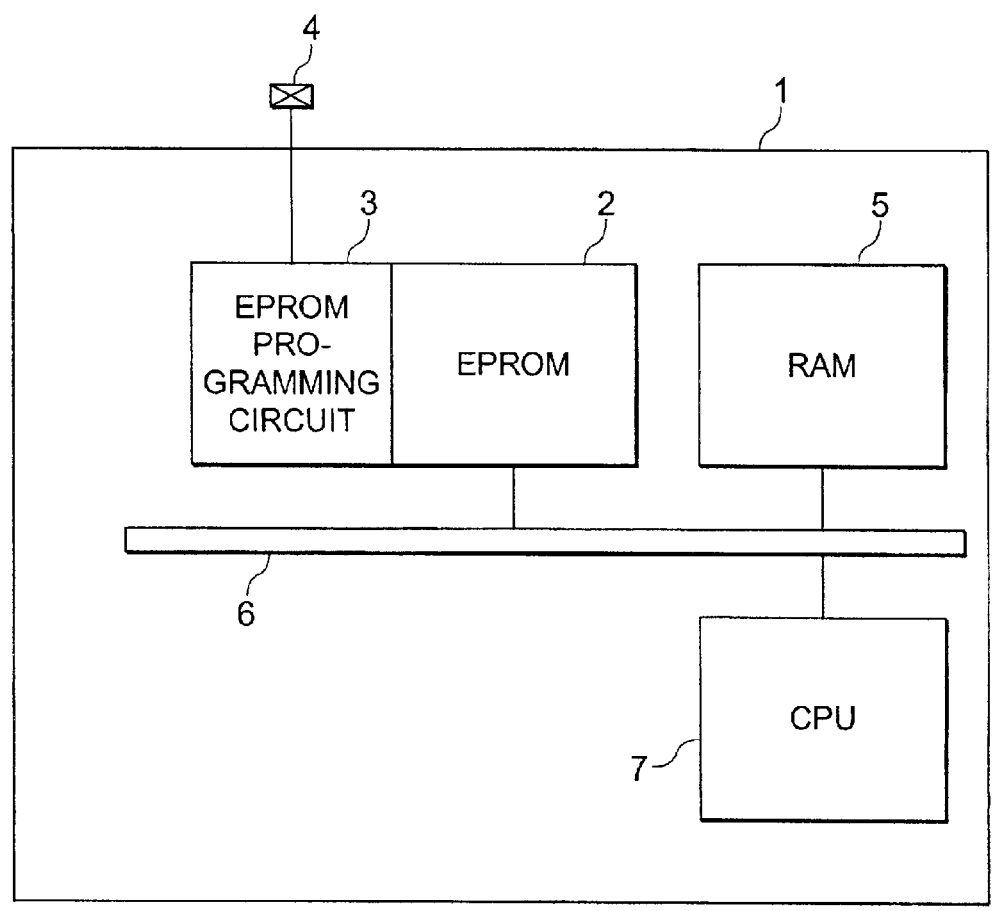
FIG. 1 is a general block diagram of a conventional OTP microcontroller.
Figure 2:
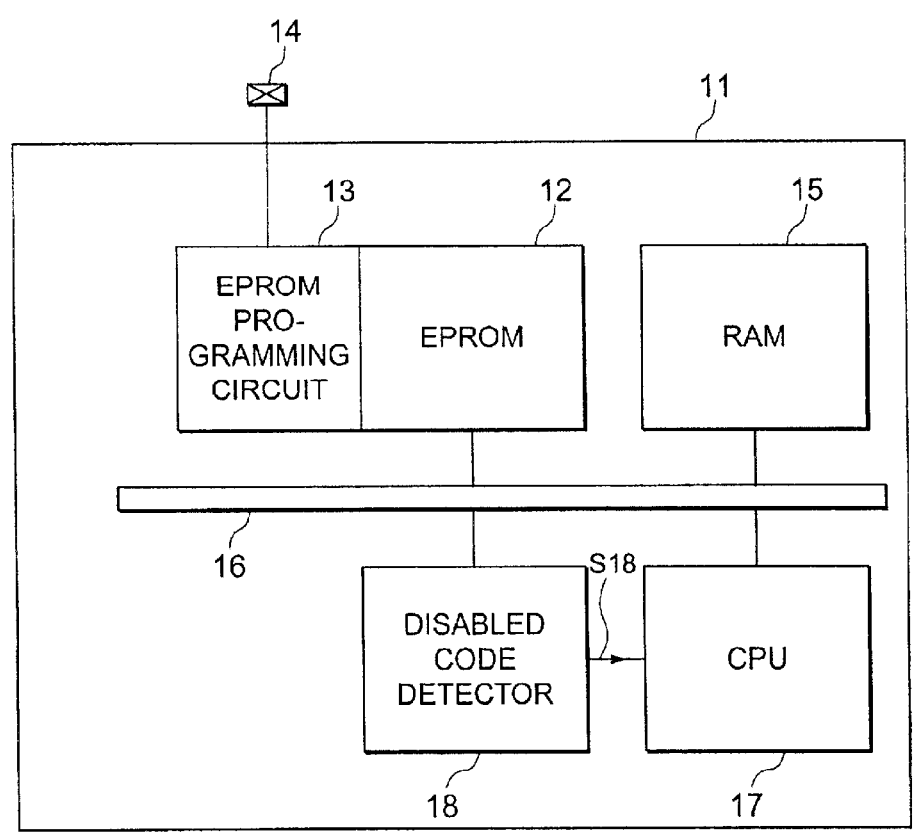
FIG. 2 is a general block diagram of an OTP microcontroller embodying the present invention.

FIG. 2 shows the general plan of an OTP microcontroller embodying the present invention. The microcontroller comprises a semiconductor chip 11 with a programmable non-volatile memory and a circuit for programming the nonvolatile memory. In the embodiments described below, the non-volatile memory is an EPROM 12 and the circuit for programming it is an EPROM programming circuit 13. The microcontroller also has a high-voltage terminal 14, a RAM 15, an internal bus 16, a CPU 17, a disabled code detector 18, and various other components (not visible).

As in a conventional microcontroller, the high-voltage terminal 14 is normally held at the power-supply voltage (VDD). During normal operation, the CPU 17 executes program code read from the EPROM 12, using the RAM 5 to store data being processed, and directs the operation of the microcontroller to carry out the application or applications implemented by the program code.

Before the program code can be executed, it must of course be stored in the EPROM 12. At this time a programming voltage VPP, higher than VDD, is applied to the high-voltage terminal 14, enabling the EPROM programming circuit 13 to program memory cells (transistors) in the EPROM 12 as described earlier.

When the EPROM 12 is originally programmed, part of the EPROM 12 is left in the non-programmed (erased) state, to hold modified program code that may be have to be added later. When such modified program code is added, the corresponding part of the original program code, which is no longer needed, is made detectable by the disabled code detector 18. This part of the original program code is then said to be disabled. During program execution, upon detecting that program execution has entered or is about to enter a disabled program area, the disabled code detector 18 generates a CPU interrupt signal S18. This signal causes the CPU 17 to execute the modified program code instead of the disabled program code, as explained later.

Figure 3:
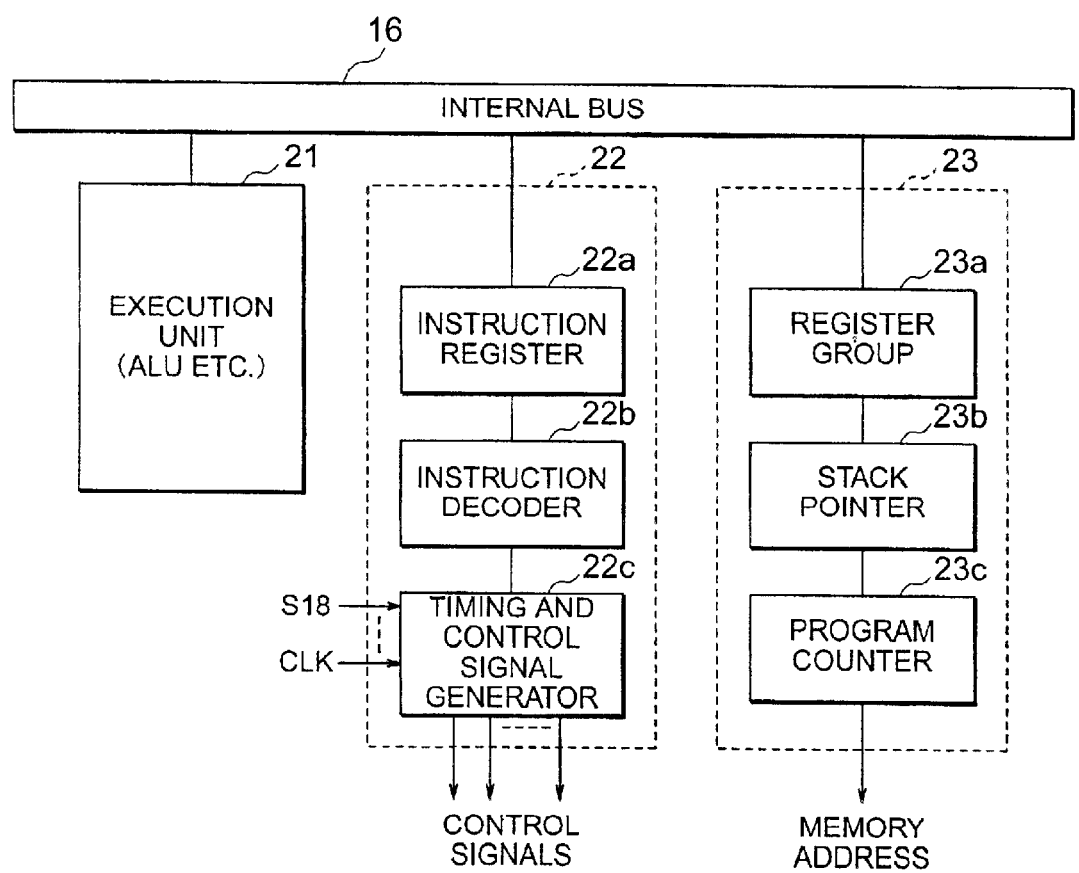
FIG. 3 is a more detailed block diagram of the central processing unit in FIG. 2.

FIG. 3 shows the general structure of the CPU 17. The CPU 17 comprises an execution unit 21, a control unit 22, and a register unit 23, all of which are linked to the internal bus 16. The execution unit 21 includes an arithmetic and logic unit (ALU) that can perform arithmetic and logical operations on data, and other units such as a load-store unit. The control unit 22 generates various control signals that control the overall operation of the microcontroller; its constituent elements include an instruction register 22a, an instruction decoder 22b that decodes the instruction held in the instruction register 22a, a timing and control signal generator 22c, and other circuits (not visible). The timing and control signal generator 22c receives the interrupt signal S18 and a clock signal (CLK). The register unit 23 has at least a register group 23a with a plurality of registers that store data, a stack pointer 23b, and a program counter 23c that outputs a memory address designating a location in the EPROM 12.

In a first embodiment of the invention, program code in the EPROM 12 is disabled by overwriting a designated instruction code on at least the initial part of the disabled area.

Although new program code cannot in general be overwritten on existing program code in an OTP microcontroller, it is possible to program individual bits that were in the non-programmed state in the existing program code. If the programmed state is the zero ('0') state, as it is in many microcontrollers, an arbitrary instruction can be changed to the all-zero instruction in this way, by programming all of the non-programmed bits. In the first embodiment, the programmed state is the zero state and the designated instruction overwritten on at least the initial part of a disabled area is an eight-bit all-zero instruction, denoted '00' in hexadecimal notation.

In many microcontrollers, the '00' instruction is the no-operation (NOP) instruction, the execution of which does not change the internal state of the CPU 17 or have any other effect. The NOP instruction is sometimes used for debugging purposes; extra debugging instructions can be inserted into a program, for example, and then changed to NOP instructions when they are no longer needed. Thus the original program stored in a microcontroller may include occasional NOP instructions. Normally, however, a program does not include a large number of consecutive NOP instructions.

Figure 4:
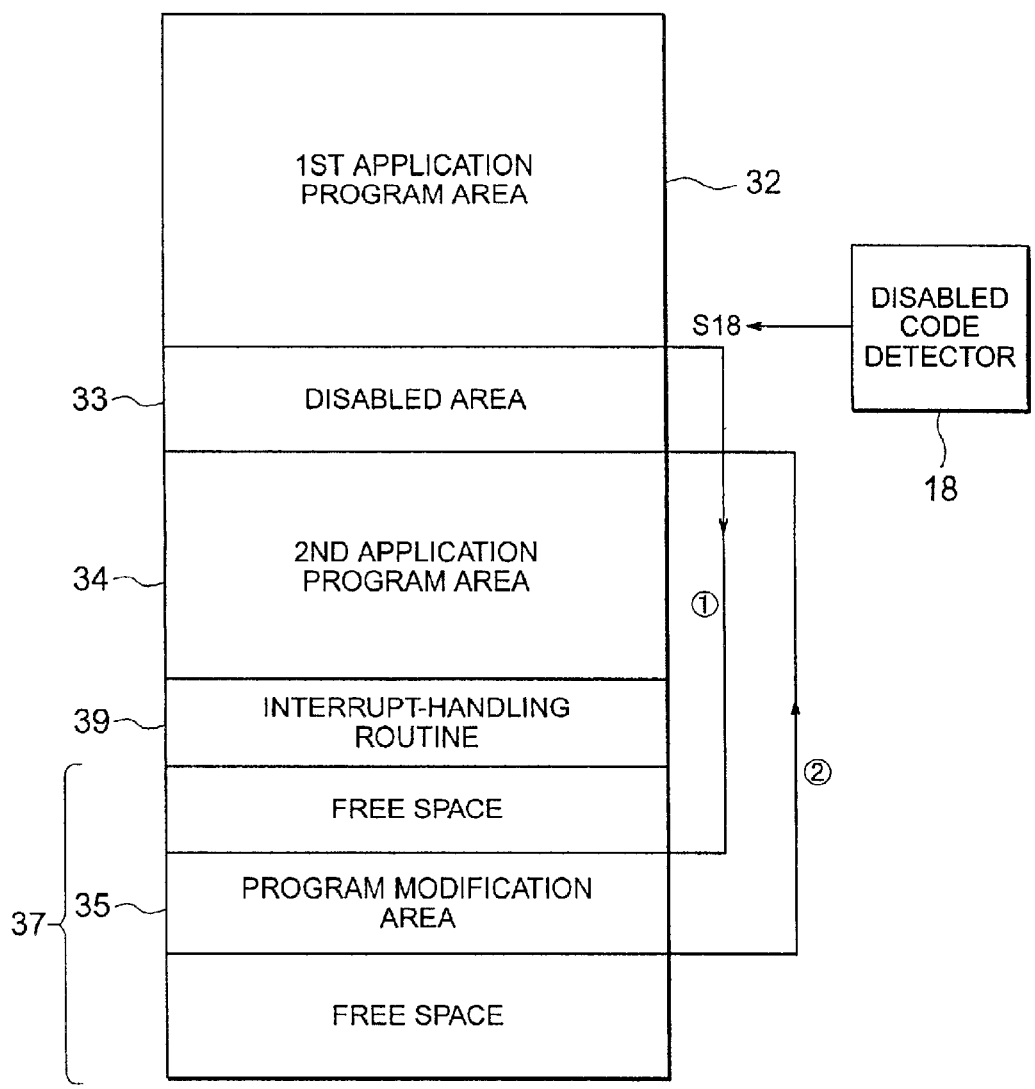
FIG. 4 is an EPROM memory map illustrating a first embodiment of the invention.

FIG. 4 shows an example of the address space 31 of the EPROM 12 in the first embodiment. In this example a first application program area 32 is followed by a disabled area 33, then a second application program area 34. The disabled area 33 originally also stored application program code, but this part of the application program has had to be modified because of, for example, a bug discovered after program development was completed. The designated instruction '00' is overwritten on at least the first eight bytes of the disabled area 33, and may be overwritten on the entire disabled area 33.

The second application program area 34 is followed by an interrupt-handling routine 39, then by free space 37. Originally, all memory cells in the free space 37 were in the erased state. When the disabled area 33 was created, however, new program code, to be executed in place of the program code in the disabled area 33, was stored in a predetermined program modification area 35 in the free space 37. This new program code will also be referred to below as a patch program.

The original application program code was self-contained and included no instructions for jumping to the program modification area 35. When program execution reaches the end of the first application program area 32 and starts to enter the disabled area 33, however, the disabled code detector 18 detects the designated instruction ('00') eight times successively and generates an interrupt signal S18. The CPU 17 then stores the address of the eighth NOP instruction on a stack in the RAM 5, at a location indicated by the stack pointer 23b, and starts executing the interrupt-handling routine 39. The interrupt-handling routine redirects program execution to the program modification area 35, as indicated by the first arrow (1) in FIG. 4.

The CPU 17 now proceeds to execute the patch program stored in the program modification area 35. The patch program concludes with instructions that cause execution to return to the beginning of the second application program area 34, as indicated by the second arrow (2). For example, the patch program may conclude with an instruction that modifies the stack contents in the RAM 5, followed by a return instruction. The application program code in the second application program area 34 is now executed.

Figure 5:
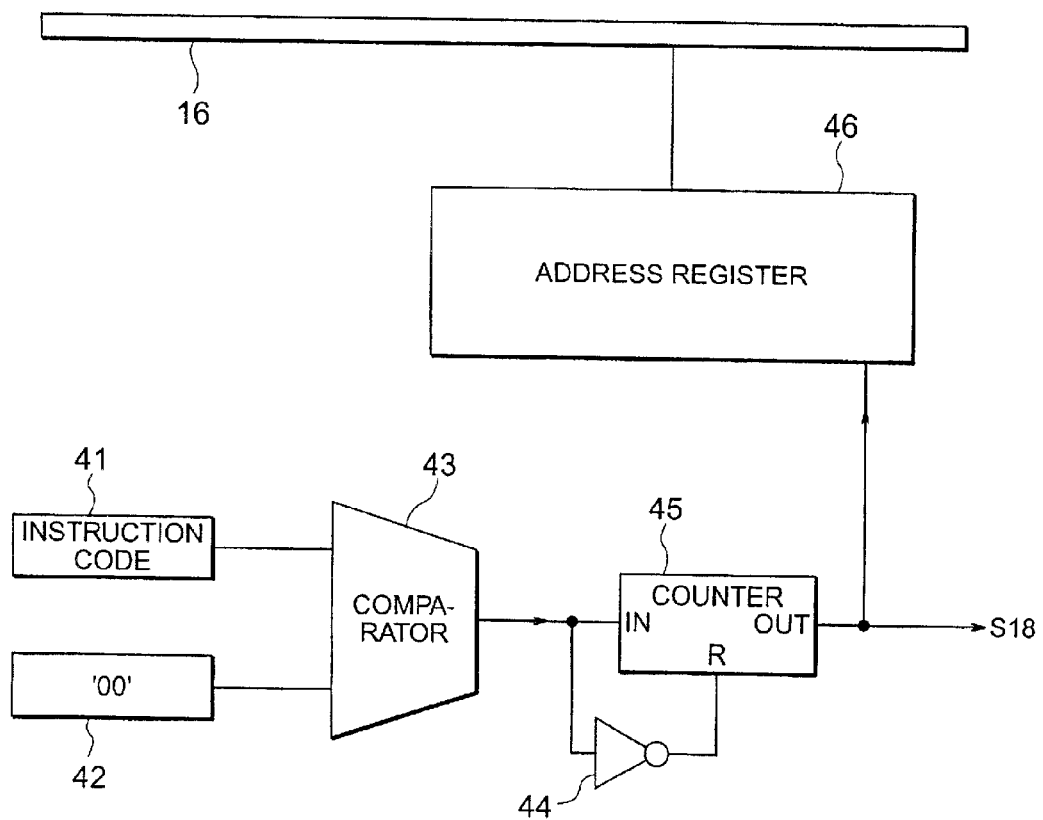
FIG. 5 is a block diagram of the disabled code detector in the first embodiment.

Referring to FIG. 5, the disabled code detector 18 in the first embodiment receives two instruction codes 41, 42 as inputs. Instruction code 41 is the instruction code currently held in the instruction register 22a, for example, or the instruction code of the instruction currently being executed at a certain pipeline stage in the CPU 17. Instruction code 42 is the designated instruction code, e.g. the instruction code of the above-described NOP instruction, indicated as '00' in the drawing. The two input instruction codes 41, 42 are compared by a comparator 43. The output of the comparator 43 is supplied to an inverter 44 and to the input terminal of a three-bit counter 45. The output of the inverter 44 is supplied to the reset (R) terminal of the counter 45. The output of the counter 45 is the interrupt signal S18 shown in FIGS. 2 and 4, which is supplied to the timing and control signal generator 22c of the CPU 17, shown in FIG. 3. The interrupt signal S18 is also supplied to an address register 46 as shown in FIG. 5. The address register 46 stores the leading address of the disabled area 33. When an interrupt signal S18 is received, the address register 46 places this address on the internal bus 16.

The disabled code detector 18 shown in FIG. 5 operates as follows.

When the application program code stored in the first application program area 32 is executed, the instruction code 41 of each stored instruction is sent to the comparator 43 and compared with the designated instruction code ('00'). When the two instruction codes agree, the comparator 43 generates an agreement signal (or carry signal) that increments the counter 45. When the two instruction codes do not agree, the comparator 43 generates a disagreement signal that is inverted by the inverter 44 and resets the counter 45.

After eight consecutive agreement signals, the three-bit counter 45 overflows and generates a carry signal at its output terminal. This is the interrupt signal S18 supplied to the timing and control signal generator 22c in the CPU 17, and to the address register 46. The address register 46 responds by placing the leading address of the disabled area 33 on the internal bus 16. The reason for this is as follows.

As illustrated in FIG. 4, the program modification area 35 may be smaller than the free space 37. Accordingly, there may be sufficient free space for a plurality of program modification areas 35, making it possible to modify the original application program code more than once. After multiple modifications have been made, the original application program area will normally include a plurality of disabled areas. The purpose of the address register 46 is to enable the interrupt handling routine to distinguish between the different disabled areas, so that program execution can be redirected to the correct program modification area in the free space 37.

In one possible scheme, the application program has a non-branching structure and all of its instructions are executed in ascending address sequence. The address register 46 is configured as a shift register with N stages, where N is an integer greater than one. The leading addresses of the disabled areas are loaded into the address register 46 in ascending address order, as part of an initialization routine not shown in FIG. 4. When program execution encounters the first disabled area, an interrupt signal S18 is generated and the address register 46 outputs the leading address of the first disabled area. When program execution encounters the second disabled area, another interrupt signal S18 is generated and the address register 46 outputs the leading address of the second disabled area. As each successive disabled area is encountered, another interrupt signal S18 is generated and the address register 46 outputs the address of that disabled area.

The free space 37 in the EPROM 12 includes N separate predetermined program modification areas. The interrupt handling program executed by the CPU 17 checks the address placed on internal bus 16, and thereby determines which program modification area in the free space 37 to jump to, using the numerical order of the addresses stored in the address register 46 as a guide.

Accordingly, the program stored in the EPROM 12 can be modified up to N times, where N is the maximum number of addresses that can be stored in the address register 46. This feature is particularly useful in correcting minor bugs that are discovered from time to time during the life cycle of a microcontroller product.

Compared with the prior art noted above, which uses an external EPROM, the first embodiment uses no external components, so it allows the program stored in a microcontroller to be modified without impairing the convenience and low cost which are among the main features of a microcontroller.

A further advantage of the first embodiment is that it detects the disabled area 33 by recognizing repeated occurrences of a single designated instruction, e.g., the NOP instruction. The disabled code detector 18 accordingly has a simple configuration, and can be added to existing microcontroller designs at little additional cost.

The first embodiment imposes a programming restriction in that the original program code must not include eight consecutive NOP instructions. This is not a serious restriction however; since it is possible to write application programs without any NOP instructions at all, it is a simple matter to avoid having eight consecutive NOP instructions in an application program.

The number of consecutive NOP instructions needed to generate an interrupt signal S18 is not limited to eight; with suitable modification of the counter 45, the interrupt signal can be triggered by any predetermined number of NOP instructions.

In a variation of the first embodiment, the programmed state is the '1' state, and the designated instruction overwritten on disabled areas is the all-one instruction (hexadecimal 'ff').

If the instruction code having all bits in the programmed state (e.g., the '00' or 'ff' instruction) is not part of the normal instruction set of the microcontroller, then the disabled code detector 18 can be simplified. The inverter 44 and counter 45 can be eliminated, and the agreement signal output by the comparator 43 can be used as the interrupt signal S18, so that an interrupt signal is generated by a single occurrence of the designated instruction ('00' or 'ff').

As a further simplification, if all instructions in the instruction set have a particular bit, such as the most significant bit, left in the non-programmed state, then the initial instruction or instructions in the disabled area 33 can be disabled simply by programming that particular bit, and the comparator 43 can detect the disabled area 33 simply by checking that particular bit. This option is available, for example, in special-purpose microcontrollers with sparse instruction sets.

The method by which the interrupt-handling routine determines which program modification area to jump to can be modified in various ways. It suffices for the address register 46 to output any type of information by which the different disabled areas in the original program area can be distinguished.

If the free space 37 has only one predetermined program modification area 35, the address register 46 can be eliminated, although in that case only one program modification can be made.

In a second embodiment of the invention, program code is disabled by storing the addresses of the disabled areas in a reserved area in the free space 37.

Figure 6:
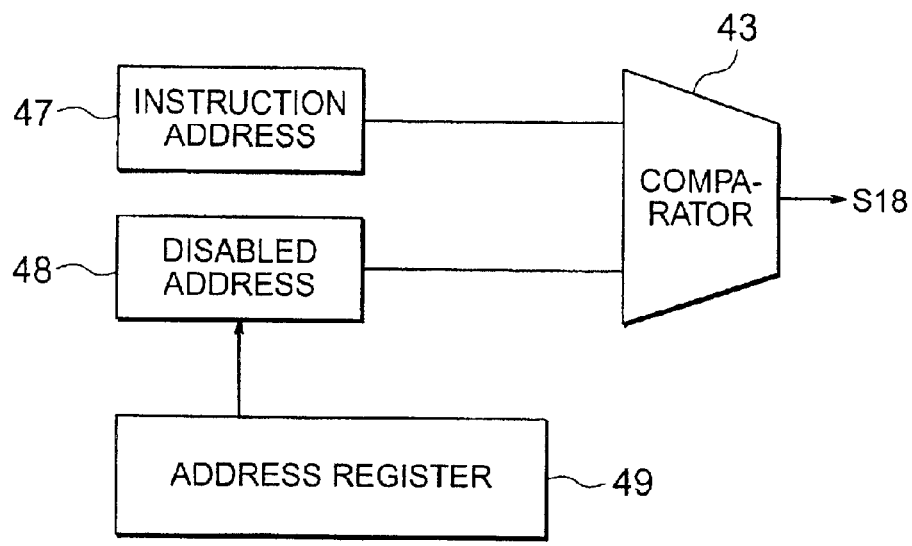
FIG. 6 is a block diagram of the disabled code detector in a second embodiment.

Referring to FIG. 6, the disabled code detector 18 in the second embodiment comprises a comparator 43 as in the first embodiment, but instead of comparing instruction codes, the comparator 43 compares instruction addresses. One input to the comparator 43 is the address 47 in the EPROM 12 of the instruction that is about to be executed by the CPU 17, as obtained from the program counter 23c, for example. The other input is a fixed disabled address 48 in the EPROM 12, which is obtained from an address register 49. When the current instruction address 47 matches the fixed disabled address 48 stored in the address register 49, the comparator 43 outputs an agreement signal as the interrupt signal S18.

Figure 7:
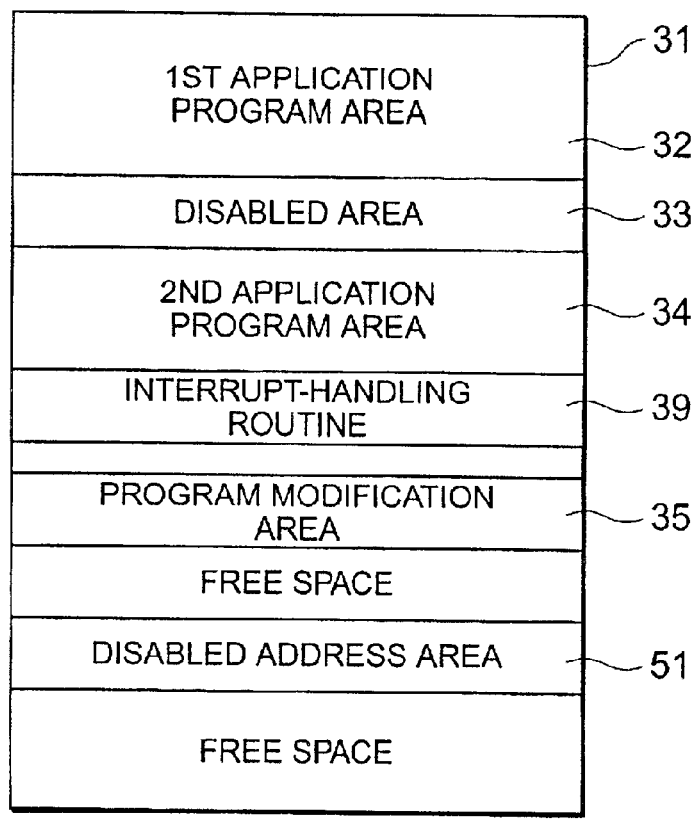
FIG. 7 is an EPROM memory map illustrating the second embodiment.

Referring to FIG. 7, the address space 31 in the second embodiment includes a first application program area 32, a disabled area 33, a second application program area 34, an interrupt-handling routine 39, and a program modification area 35, as in the first embodiment. The address space 31 in the second embodiment, however, also includes a disabled address area 51 that, together with the program modification area 35, occupies part of the original free space. When modified program code is written in the program modification area 35, the leading address of the corresponding disabled area 33 is written in the disabled address area 51.

The second embodiment operates as follows.

Before executing the application program code stored in the EPROM 12, the CPU 17 executes an initialization routine, which is also stored in the EPROM 12 but is omitted from FIG. 7 for simplicity. (Alternatively, the initialization routine may constitute the first part of the first application code area 32.) As part of the initialization routine, the CPU 17 reads the address of the disabled area 33 from the disabled address area 51 and loads this address into the address register 49. Needless to say, reading this address from the disabled address area 51 does not cause an interrupt.

After the initialization routine, the CPU 17 begins executing application program code. After executing the code in the first application program area 31, the CPU 17 fetches the first instruction in the disabled area 33, but since the address 47 of this instruction is the address 48 stored in the address register 49, the comparator 43 outputs an interrupt signal S18. Instead of executing the first instruction in the disabled area 33, accordingly, the CPU 17 executes the interrupt-handling routine 39. The interrupt-handling routine redirects program execution to the program modification area 35, and the patch program stored in the program modification area 35 is executed in place of the program code in the disabled area 33. The patch program ends by executing instructions that return to the beginning of the second application program area 34. The CPU 17 then proceeds to execute the program code in that area 34.

The reason for the address register 49 is that with present EPROM technology, it would be difficult or impossible to feed the address stored in the disabled address area 51 directly from the EPROM 12 to the comparator 43. This could only be done by providing a separate EPROM specifically to hold the fixed address, but that would require extra chip area and extra input/output terminals for programming, making the OTP microcontroller more expensive and less convenient.

Before the programming of the program modification area 35, all bits in the disabled address area 51 are in the non-programmed state or '1' state, so the address loaded into the address register 49 is equal to or greater than the highest address in the address space 31. This address does not correspond to the address of any instruction in the application program area, so the entire application program can be executed without generating an interrupt S18. If necessary, the comparator 43 can also be modified so as to ignore agreement with an all-'1' address.

To permit the original program code to be modified N times, where N is an integer greater than one, the second embodiment can be modified by providing N comparators and N address registers in the disabled code detector 18. As each new program modification is made, the address of the corresponding disabled area is added to the disabled address area 51. The initialization routine loads each address in the disabled address area 51 into a separate address register in the disabled code detector 18. If each of the N comparators in the disabled code detector 18 functions as a separate interrupt source, the interrupt-handling routine for each interrupt source can easily redirect program execution to the corresponding program modification area 35. Alternatively, the disabled code detector 18 as a whole can function as a single interrupt source, and the interrupt-handling routine can compare the address saved on the stack when the interrupt occurred with the addresses in the disabled address area 51 to decide which patch program to execute.

In the second embodiment, it is also possible to modify a patch program stored in a program modification area 35. Part or all of the patch program can be disabled in the same way that part of the original application program code is disabled, by storing the leading address of the disabled part in the disabled address area 51.

If necessary, a modification can be undone by removing the address of the disabled program code from the disabled address area 51, so that the program code is no longer disabled. The address is removed by, for example, programming all non-programmed bits of the address, so that the address becomes an all-zero address. The initialization routine may be arranged so as to skip any all-zero address found in the disabled address area 51, and load the next non-zero address into an address register 49 in the disabled code detector 18. Alternatively, the comparator 43 can be modified so as to ignore agreement with an all-zero address.

A modification can also be redone in this way. The address of the disabled program code is removed from the list of disabled addresses in the disabled address area 51 by programming all non-programmed bits of the address as described above. At the same time, a new patch program for the same disabled program code is stored in a new program modification area 35, and the address of the disabled program code is added to the end of the list of addresses in the disabled address area 51.

Compared with the first embodiment, on the one hand, the second embodiment requires a separate comparator for each disabled area of program code, but on the other hand, the second embodiment places no programming restrictions on the use of NOP instructions, and enables modifications to be undone and redone. Thus the second embodiment is more flexible than the first embodiment, although the disabled code detector 18 may require more hardware in the second embodiment than in the first embodiment.

The second embodiment differs from the prior art described in Japanese Unexamined Patent Application No. 2995030 by providing a disabled address area 51 in the EPROM 12, thereby acquiring the capability to undo modifications by removing addresses from the disabled address area 51, and to modify the same part of an application program repeatedly. Thus the second embodiment is also more flexible than the prior art, as well as more convenient because of not requiring an external EPROM.

The first and second embodiments can be combined as follows. The disabled code detector 18 has the structure described in the first embodiment, detecting disabled areas by detecting occurrences of a designated instruction code, but does not output the addresses of the disabled areas on the internal bus 16. That is, the address register 46 is eliminated. The EPROM 12 has a disabled address area 51. As each program modification is made, the address of the corresponding disabled area is added to the disabled address area 51. The interrupt-handling routine 39 compares the addresses in the disabled address area 51 with, for example, an address on the stack to decide which patch program to execute.

The first and second embodiments demonstrated two different ways of detecting disabled program areas, under the assumption that modified program code was stored at predetermined locations in the free space in the EPROM 12. The third embodiment provides a more flexible method of storing modified program code in the free space. For simplicity, the third embodiment will be assumed to detect disabled program areas by detecting a single occurrence of the all-zero (e.g., NOP) instruction.

Figure 8:
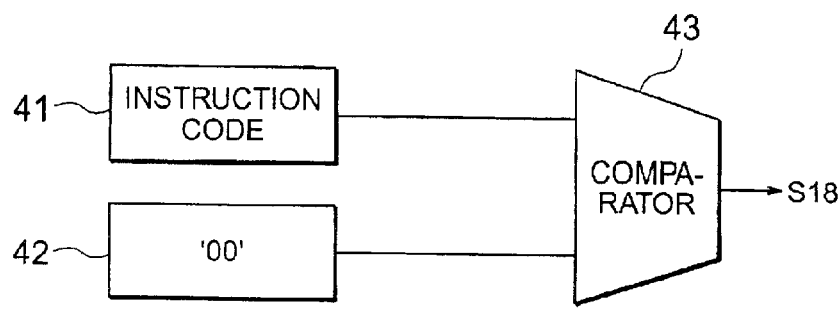
FIG. 8 is a block diagram of the disabled code detector in a third embodiment.

Accordingly, the disabled code detector 18 in the third embodiment has the simple structure shown in FIG. 8, in which a comparator 43 compares the current instruction code 41 with the '00' instruction code 42. If the current instruction code 41 is the '00' instruction code, the comparator 43 generates an interrupt signal S18.

Figure 9:
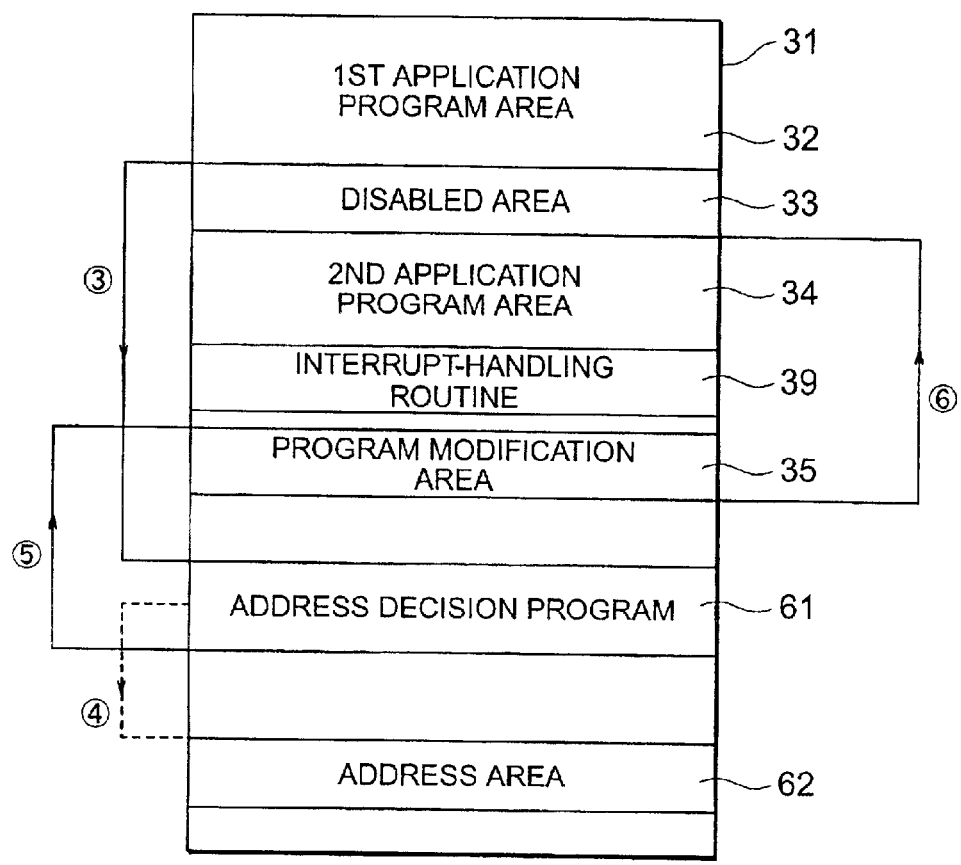
FIG. 9 is an EPROM memory map illustrating the third embodiment.

Referring to FIG. 9, in the third embodiment, the address space 31 of the EPROM 12 includes a first application program area 32, a disabled area 33, a second application program area 34, an interrupt-handling routine 39, a program modification area 35, an address decision program 61, and an address area 62. The first instruction in the disabled area 33 is a '00' instruction created by programming non-programmed bits of the existing instruction code as described in the first embodiment. The address area 62 stores the leading address of the program modification area 35; this address is written in the address area 62 when the program modification area 35 is programmed.

The third embodiment operates as follows.

After executing the program code in the first application program area 31, the CPU 17 fetches the '00' instruction at the head of the disabled area 33. The comparator 43 in the disabled code detector 18 detects this instruction and generates an interrupt S18, causing the CPU 17 to begin executing the interrupt-handling routine 39. The interrupt-handling routine passes control to the address decision program 61, as indicated by arrow (3) in FIG. 9. The address decision program 61 refers to the address area 62, as indicated by the dotted arrow (4), to obtain the leading address of the program modification area 35, then passes control to the patch program stored in the program modification area 35, as indicated by arrow (5). The CPU 17 now executes the patch program in the program modification area 35 in place of the program code in the disabled area 33. The patch program ends with instructions that cause control to return to the first instruction in the second application program area 34, as indicated by arrow (6).

The third embodiment enables patch programs to be stored at arbitrary locations in the free space, since the address decision program 61 can use the address information in the address area 62 to find the address of each program modification area 35. When there is more than one program modification area 35, the address area 62 may also store information such as the leading address of the corresponding disabled area 33. The address decision program 61 can compare this information with, for example, an address stored on the stack to decide which patch program to execute.

It should be noted that in the third embodiment, a restriction is placed on the patch programs. Specifically, the patch program stored in a program modification area 35 must be independent of the main program (the application program code stored in the application program areas 32, 34). For example, special consideration is required if the patch program makes use of linking instructions such as jump instructions in the main program. The reason is that, under the restriction that the patch program must be stored in the EPROM 12, it is not possible to alter any part of the main program outside the disabled area 33. If there were a plurality of jump instructions in the main program that jumped into the program modification area 35, via the disabled area 33, each jump instruction would activate the interrupt-handling routine, causing the patch program to be executed, and it would not be possible to tell which jump instruction had been used to link to the patch program. To avoid this difficulty, the patch program may need to include extra code.

Compared with the first two embodiments, the third embodiment requires less hardware but more software. That is, the disabled code detector 18 has the simple structure shown in FIG. 8, but the EPROM 12 must store an address decision program 61 and have an address area 62. The need for the address decision program 61 and address area 62 is offset, however, by the ability to pack patch programs more tightly into the free space 37, since the patch programs can be stored at arbitrary addresses in the free space 37.

It is possible to combine the second and third embodiments. When a program modification is made, both the address of the disabled program code area and the address of the corresponding patch program are stored in the EPROM 12. The disabled code detector 18 detects disabled areas by their addresses as described in the second embodiment. An address decision program 61 redirects program execution as described in the third embodiment.

The fourth embodiment of the invention is an OTP microcontroller that can be reprogrammed without the need for extra hardware to detect disabled program areas.

Figure 10:
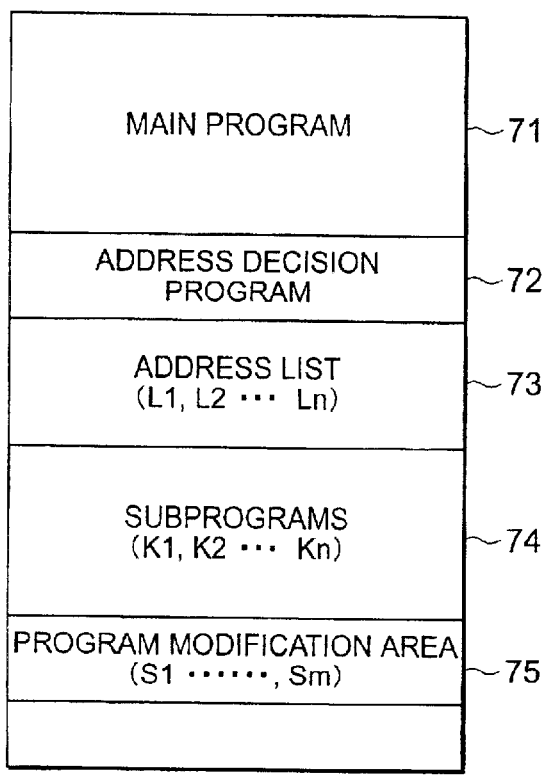
FIG. 10 is an EPROM memory map illustrating a fourth embodiment.

Referring to FIG. 10, the EPROM 12 in the fourth embodiment originally stores a main program 71, an address decision program 72, an address list 73, and a plurality of subprograms 74. After program modifications have been made, the EPROM 12 also stores one or more modified subprograms in a program modification area 75.

The main program 71 performs initialization and overall control functions. The subprograms 74 (K1, K2, . . . , Kn, where n is an integer greater than one) perform individual functions or tasks at the direction of the main program 71. The subprograms 74 include, for example, a communication program, a display program, a program that performs mathematical computations, and so on.

The address decision program 72 uses the address list 73 to redirect program execution from the main program 71 to the subprograms 74. The address decision program 72 may form part of the main program 71, or may be separate from the main program 71, as shown. The address list 73 is a table with n entries (L1, L2, . . . , Ln) originally listing the addresses of the subprograms 74.

The program modification area 75 is originally free space. If it becomes necessary to modify one of the subprograms 74, an entire new version of the subprogram is stored in the program modification area 75, and its address is stored in the address list 73, replacing the existing address of the subprogram 74. In the drawing, m modified programs (S1, . . . , Sm) have been stored in the program modification area 75, m being an integer greater than one.

Figure 11:
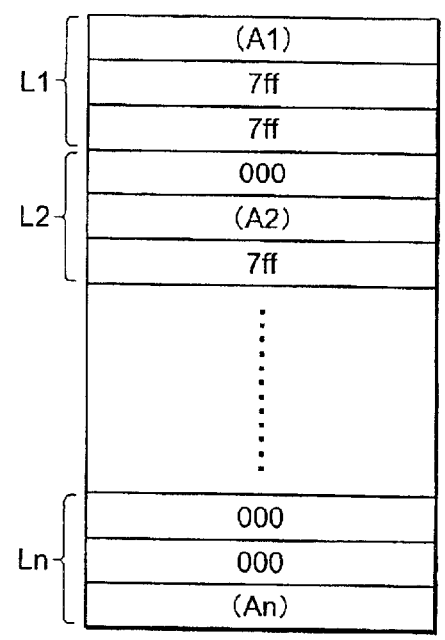
FIG. 11 shows an example of the contents of the address list in FIG. 10.

FIG. 11 shows an example of the contents of the address list 73 for a two-kilobyte EPROM 12, in which the maximum address is '7ff' in hexadecimal notation. Each entry in this example is originally a triple address entry giving the address of one of the subprograms 74, followed by two spare addresses in which all bits are in the non-programmed ('1') state.

The first entry L1 in FIG. 11 is still in its original condition: the first address (A1) is the address of the first subprogram 74 K1; the two spare addresses are still in the non-programmed state ('7ff' hexadecimally denotes an all-'1'-bit address).

In this example, the second subprogram K2 has been replaced by one of the m modified subprograms stored in the program modification area 75. In the second entry L2 in the address list 73, accordingly, the address of the second subprogram K2 has been deleted by programming all non-programmed bits, changing the address to an all-'0'-bit address ('000'). The first spare address in entry L2 has been programmed with the address (A2) of a modified program (S1, for example) in the program modification area 75. The second spare address in this entry L1 is still in the non-programmed state ('7ff').

In the last entry Ln, subprogram Kn has been modified twice. First, it was replaced with a modified subprogram (S2, for example); then this modified program has been replaced with another modified subprogram (Sm, for example). Accordingly, the first two addresses in entry Ln have both been changed to '000' and the last address has been programmed with the address (An) of the modified subprogram (e.g., Sm) that is now valid.

Needless to say, the number of spare addresses per entry in the address list 73 is not limited to two, as long as there is at least one spare address per entry.

The fourth embodiment operates as follows.

As the code in the main program 71 in FIG. 10 is executed, from time to time the address decision program 72 is called on to execute one of the subprograms 74. The address decision program 72 reads the corresponding entry in the address decision program 72, finds the first non-zero address in that entry, and passes control to that address.

In FIG. 11, for example, if called on to execute the first subprogram (K1), the address decision program 72 reads entry L1, gets the address (A1) of the first subprogram (K1), and passes control to that subprogram.

If called on to execute the second subprogram (K2), the address decision program 72 reads entry L2, skips the first address ('000') because it is zero, and gets the address (A2) of one of the modified subprograms (e.g., S1). Control is then passed to that modified subprogram, which is executed in place of subprogram K1.

Similarly, if called on to execute the n-th subprogram (Kn), the address decision program 72 reads entry Ln, skips the first two addresses (both '000') and gets the address (An) of another one of the modified subprograms, which is executed in place of program Kn.

Unlike the preceding embodiments, the fourth embodiment does not permit arbitrary areas of an application program to be disabled. When a bug is found in one of the subprograms 74, it is necessary to replace the entire subprogram 74, even if only a small part of the subprogram was defective. Accordingly, the modified programs stored in the program modification area 75 are comparatively large, and to provide space for them, the microcontroller may need a comparatively large EPROM 12.

It is also necessary for the program code stored in the EPROM 12 to have the type of structure shown in FIG. 10, comprising a main program 71 and a plurality of subprograms 74. Much microcontroller code is structured in this way, however, and microcontrollers often have considerable unused EPROM space, making it possible to practice the fourth embodiment simply by providing spare addresses in each entry in the address list 73, and programming the address decision program 72 to skip over all-zero addresses.

An advantage of the fourth embodiment is that no additional hardware is needed to detect disabled program areas.

In a variation of the fourth embodiment, addresses are deleted from the address list 73 by programming flag bits, instead of by changing the addresses to all-zero addresses.

The invention has been described in relation to EPROM, but is not necessarily restricted to this type of non-volatile memory. Moreover, the structure of the microcontroller and its CPU is not limited to the structures shown in FIGS. 2 and 3, and the structure of the disabled code detector is not limited to the structures shown in FIGS. 5, 6, and 8.

Those skilled in the art will recognize that further variations are possible within the scope claimed below.

What is claimed is:

1. A microcontroller comprising:
   a nonvolatile memory storing instructions, each instruction having an address, the instructions constituting a first program with at least one disabled part, a second program replacing the disabled part of the first program, and an interrupt-handling routine for redirecting program execution from the disabled part of the first program to the second program;
   a disabled code detector for detecting the disabled part of the first program in the nonvolatile memory and generating an interrupt signal; and
   a processing unit that fetches and executes the instructions stored in the nonvolatile memory, thereby executes the first program, responds to the interrupt signal by executing the interrupt-handling routine, is thereby redirected to the second program, executes the second program, and then returns to execution of the first program.

2. The microcontroller of claim 1, wherein the disabled code detector comprises a comparator for comparing each instruction fetched by the processing unit from the nonvolatile memory with a designated instruction, the disabled part of the first program being disabled by changing at least an initial instruction in the disabled part to the designated instruction.

3. The microcontroller of claim 2, wherein the disabled code detector also comprises a counter for counting consecutive occurrences of the designated instruction, the interrupt signal being generated when the designated instruction is detected a predetermined number of times consecutively.

4. The microcontroller of claim 1, wherein the nonvolatile memory also includes a disabled address area storing an address of each disabled part in the first program.

5. The microcontroller of claim 4, wherein the disabled code detector comprises:
   an address register for storing an address; and
   a comparator for comparing the address stored in the address register with the address of each instruction fetched by the processing unit;
   and wherein the first program includes an initialization routine causing the processing unit to load an address from said disabled address area into the address register.

6. The microcontroller of claim 1, wherein the nonvolatile memory also has an address area storing an address of said second program.

7. The microcontroller of claim 6, wherein the nonvolatile memory also stores an address decision program that refers to said address area to determine the address of said second program, the address decision program being used by the interrupt-handling routine to redirect the processing unit from the first program to the second program.

8. The microcontroller of claim 1, wherein the nonvolatile memory is an erasable programmable read-only memory.

9. A microcontroller comprising:
   a nonvolatile memory storing a main program, an address decision program, an address list, and a plurality of subprograms, the subprograms including instructions for carrying out respective tasks, the main program including instructions for controlling execution of the subprograms, the address list storing addresses of the subprograms, and the address decision program including instructions for redirecting execution from the main program to the subprograms by referring to the address list, the nonvolatile memory also having a program modification area storing at least one modified subprogram to be executed in place of one of said subprograms, the address list also storing an address of each said modified subprogram, the addresses of subprograms for which modified subprograms are provided being marked as deleted from the address list, the address decision program also including instructions for recognizing deleted addresses in the address list and reading the address of a modified subprogram from the address list in place of each deleted address; and
   a processing unit that fetches and executes the instructions stored in the nonvolatile memory, thereby executes the main program and the address decision program, executes the modified subprograms stored in the program modification area, and executes the subprograms for which modified subprograms are not stored in the program modification area.

10. The microcontroller of claim 9, wherein the nonvolatile memory is an erasable programmable read-only memory.

11. A method of modifying a program stored in a nonvolatile memory in a microcontroller, the program including a main program and a plurality of subprograms executed under control of the main program, the method comprising the steps of:
   (a) providing an address list in the nonvolatile memory for redirecting program execution from the main program to the subprograms, the address list having an entry for each subprogram stored in the nonvolatile memory, said entry including an address of the subprogram and a spare address;
   (b) storing a modified subprogram in an unused part of the nonvolatile memory, the modified subprogram functioning as a replacement for one subprogram among the subprograms stored in the nonvolatile memory;
   (c) marking the address of said one subprogram as invalid in the entry for said one subprogram in the address list; and
   (d) programming an address of the modified subprogram into the spare address in the entry for said one subprogram in the address list, whereby execution is redirected from the main program to the modified subprogram instead of being redirected from the main program to said one subprogram.

12. The method of claim 11, wherein the nonvolatile memory is an erasable programmable read-only memory.

13. The method of claim 12, wherein said step (c) comprises programming all non-programmed bits of said address.

14. The method of claim 11, wherein each said entry in the address list includes more than one spare address, whereby each subprogram can be modified more than once.

* * * * *